(12) United States Patent
Sevy et al.

(10) Patent No.: US 12,270,985 B2
(45) Date of Patent: Apr. 8, 2025

(54) ELECTRONIC FOCAL ADJUSTMENT SYSTEM FOR NIGHT VISION DEVICES

(71) Applicants: Caleb Sevy, Rexburg, ID (US); Joseph Sevy, Rexburg, ID (US); David Sevy, Rexburg, ID (US)

(72) Inventors: Caleb Sevy, Rexburg, ID (US); Joseph Sevy, Rexburg, ID (US); David Sevy, Rexburg, ID (US)

( * ) Notice: Subject to any disclaimer, the term of this patent is extended or adjusted under 35 U.S.C. 154(b) by 0 days.

(21) Appl. No.: 18/385,515

(22) Filed: Oct. 31, 2023

(65) Prior Publication Data
US 2024/0345379 A1 Oct. 17, 2024

Related U.S. Application Data

(60) Provisional application No. 63/459,824, filed on Apr. 17, 2023.

(51) Int. Cl.
| | |
|---|---|
| *A42B 3/04* | (2006.01) |
| *F41G 1/35* | (2006.01) |
| *F41G 1/38* | (2006.01) |
| *G02B 7/04* | (2021.01) |
| *G02B 23/12* | (2006.01) |
| *G02B 23/18* | (2006.01) |
| *G02B 27/01* | (2006.01) |
| *G02C 7/08* | (2006.01) |

(52) U.S. Cl.
CPC ............. *G02B 23/18* (2013.01); *A42B 3/042* (2013.01); *F41G 1/35* (2013.01); *F41G 1/38* (2013.01); *G02B 7/04* (2013.01); *G02B 23/12* (2013.01); *G02B 27/0176* (2013.01); *G02C 7/088* (2013.01); *G02B 2027/0138* (2013.01)

(58) Field of Classification Search
CPC .... G02B 23/18; G02B 23/12; G02B 27/0176; G02B 2027/0138; G02C 7/088; A42B 3/042; F41G 1/35; F41G 1/38
See application file for complete search history.

(56) References Cited

U.S. PATENT DOCUMENTS

| | | | | |
|---|---|---|---|---|
| 7,350,329 | B1 * | 4/2008 | Bell | F41G 11/001 89/200 |
| 12,018,914 | B2 * | 6/2024 | Pischke | F41G 1/30 |
| 2005/0088729 | A1 * | 4/2005 | Edwards | F41G 1/38 359/359 |
| 2005/0252063 | A1 * | 11/2005 | Flannigan | F41G 1/38 42/118 |
| 2012/0050536 | A1 * | 3/2012 | Dobbie | G02B 7/28 359/811 |
| 2023/0152059 | A1 * | 5/2023 | Hamilton | F41A 9/62 42/6 |

* cited by examiner

*Primary Examiner* — Mustak Choudhury (57) ABSTRACT

An electronic focal adjustment system for night vision devices includes a focal adjustment apparatus, a power source apparatus, a button apparatus, and a sensor device. The focal adjustment apparatus may also include a housing that couples to a night vision device. The power source apparatus may communicate with the focal adjustment apparatus, which is configured to interact with an objective lens of the night vision device. A user may set the system to desired focal adjustments. Accordingly, the power source apparatus may send a signal to the focal adjustment apparatus to activate a motor to adjust the system to a user's pre-calibrated focal adjustments.

18 Claims, 14 Drawing Sheets

ELECTRONIC FOCAL ADJUSTMENT SYSTEM FOR NIGHT VISION DEVICES

CROSS-REFERENCE TO RELATED APPLICATIONS

This application claims the benefit of U.S. Provisional Application Ser. No. 63/459,824, filed on Apr. 17, 2023, which is incorporated herein by reference.

TECHNICAL FIELD

The present disclosure relates to night vision devices. More particularly, the present disclosure relates to a focal adjustment system for night vision devices.

BACKGROUND

Night vision made its appearance during World War II. Since then, capabilities of night vision have progressed exponentially. Night vision comes in a variety of devices, including goggles, telescopic sights, among others. To function, night vision enhances ambient visible light and converts near-infrared light into visible light, which allows visualization of surroundings when light levels are low. Goggles and other night vision devices often have protective lenses to prevent bloom out, meaning that white or green colors will fill the field of view.

While there are numerous benefits to night vision and improvements have been made over the years, there are still some inherent issues. One of these issues occurs due to a user having no way to adjust the focal point of the night vision while in operation through either the night vision device or the protective lenses. As an example of this issue, when a user looks at objects in the distance with night vision, the distant objects will be seen clearly. However, all objects between the distant objects and the user will be blurry. With current night vision units, in order to see something closer, users have to re-adjust an objective lens of a night vision device, which often requires a user to use both of their hands. This is one of the biggest limitations of night vision—lack of focal point adjustability when looking through the device.

Accordingly, there is a need for a system that rapidly and accurately changes the focal point of the night vision device on command. The present invention seeks to solve these and other problems.

SUMMARY OF EXAMPLE EMBODIMENTS

In one embodiment, an electronic focal adjustment system for night vision devices (hereinafter referred to as "adjustment system") comprises a focal adjustment apparatus, a power source apparatus, a button apparatus, and a sensor device. The focal adjustment apparatus may comprise a housing. The housing may have one or more first ports that may be configured to receive, for example, communication cables. The housing may fasten to a lens ring and a lens mount, thereby allowing a user to secure the lens ring and lens mount to the focal adjustment apparatus via first fasteners. The lens ring may comprise finger grooves. An internal compartment of the housing may include a digital encoder, a motor proximate the digital encoder, a motor gear fastened to the motor, an encoder gear that is configured to function with the motor gear, and a switch that fastens to the housing.

The lens ring may be configured to receive a lens cover. The lens cover may snap onto the finger grooves of the lens ring. The lens cover may include a lens, such as a translucent or opaque lens.

The adjustment system may comprise the power source apparatus which connects to the focal adjustment apparatus so as to provide power thereto. The power source apparatus may be coupled to a helmet, a cap, or on the user's person. The power source apparatus may comprise a battery housing to receive a power source. A battery drawer which comprises a power source compartment may be removably attachable from the battery housing so as to provide access to the power source compartment and the power source. Furthermore, on a rear of the battery housing may be a back plate that covers and/or circumscribes a plurality of battery ports. The rear of the battery housing may also have a battery switch, a motor driver that interacts with the switch, and a processor.

The button apparatus may include a front button cover and a back button cover. The back button cover may comprise a button apparatus port and a PCB board. A plurality of buttons may communicate and interact with the PCB board. When in use, the button apparatus may be positioned on a side of a helmet, on a cap, or on a user's person.

The sensor device may comprise a sensor housing and a sensor back plate. Positioned in the back plate may be a plurality of sensor ports that may receive cables so as to communicate with the focal adjustment apparatus, the power source apparatus, and/or the button apparatus. The sensor device may comprise sensors, such as ultrasonic sensors. The sensor device may also include a gyroscope.

DETAILED DESCRIPTION OF EXAMPLE EMBODIMENTS

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a system that rapidly and accurately changes the focal point of the night vision device on command. The present invention seeks to solve these and other problems.

Night vision comes in a variety of devices, including goggles, telescopic sights, among others. To function, night vision enhances ambient visible light and converts near-infrared light into visible light, which allows visualization of surroundings when light levels are low. While there are numerous benefits to night vision and improvements have been made to devices over the years, there remains key issues with the devices. One of these issues is presented in focal point adjustment, meaning that a user has no way to adjust the focal point of the night vision while in operation.

As an example of this issue, when a user looks at objects in the distance with night vision, the distant object will be seen clearly. However, all objects between the distant objects and the user will be blurry.

With current night vision units, in order to see something closer, users have to adjust the objective lens of the night vision device with both hands, which may not be effective. This limitation could cause harm to armed forces when in a dangerous situation. Some have attempted to fix this issue by creating a manual adjustment. However, even if there is a manual adjustment to adjust the focal point, it creates another task for a user to perform. Further, in a difficult, adrenaline filled situation, it may be problematic for a user to find the correct positions on the night vision device manually so as to have the most clarity and it takes precious time that a user may not have.

The system described herein utilizes various components so as to electronically adjust the focal point of the night vision device for a user based on pre-calibrated distances. The system may comprise one or more gears, a motor, one or more sensors, a power source apparatus, and a computing device within, or separate from, the power source apparatus, such as a processor and a controller, that are configured to interact with a lens mount and a lens ring. A user may set the system to desired focal adjustments that are stored in the adjustment system. As such, the adjustment system, such as the processor and controller, may send signals and activate the motor and the gears to adjust the system to a user's pre-calibrated distances. It will be understood that the system allows a night vision device to quickly adjust to a specific user so as to increase clarity in the night vision device and ultimately, provide additional protection for the user in combat situations and additional information regarding the user's surroundings.

In one embodiment, an electronic focal adjustment system 100 (hereinafter referred to as "adjustment system") for night vision devices comprises a focal adjustment apparatus 102, a power source apparatus 104, a button apparatus 106, and a sensor device 108.

Figure 1:
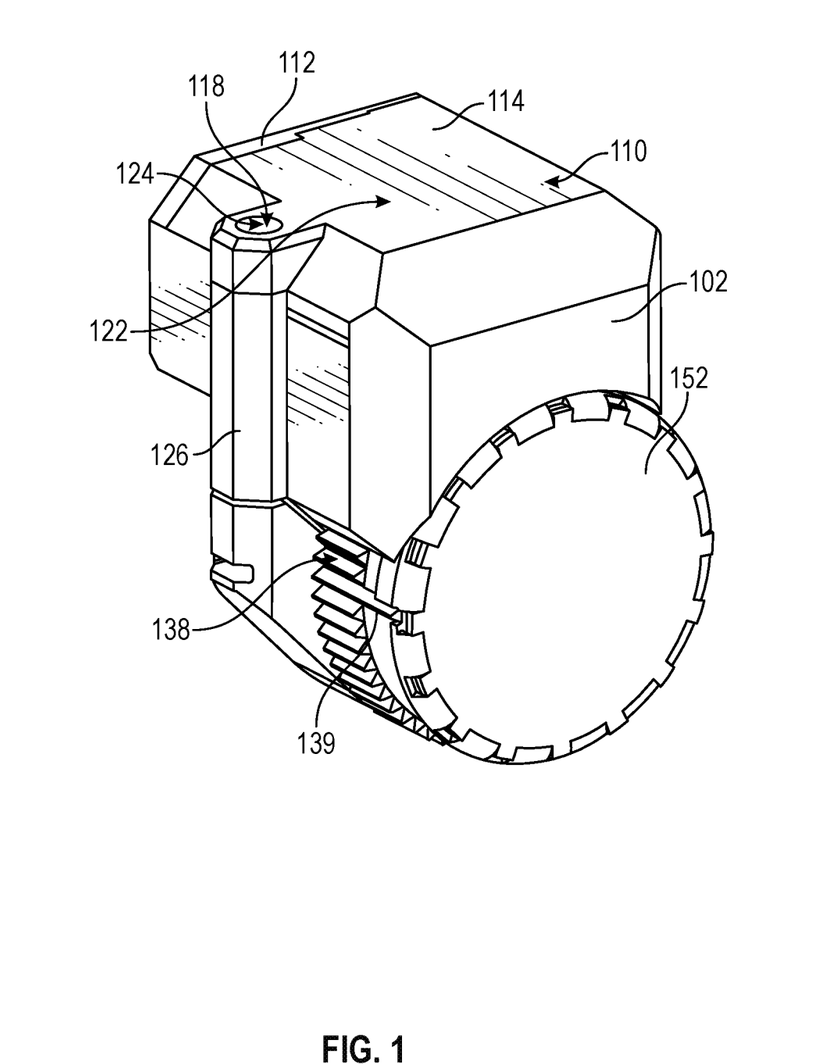
FIG. 1 illustrates a front, side perspective view of a focal adjustment apparatus of an electronic focal adjustment system for night vision devices.
Figure 2:
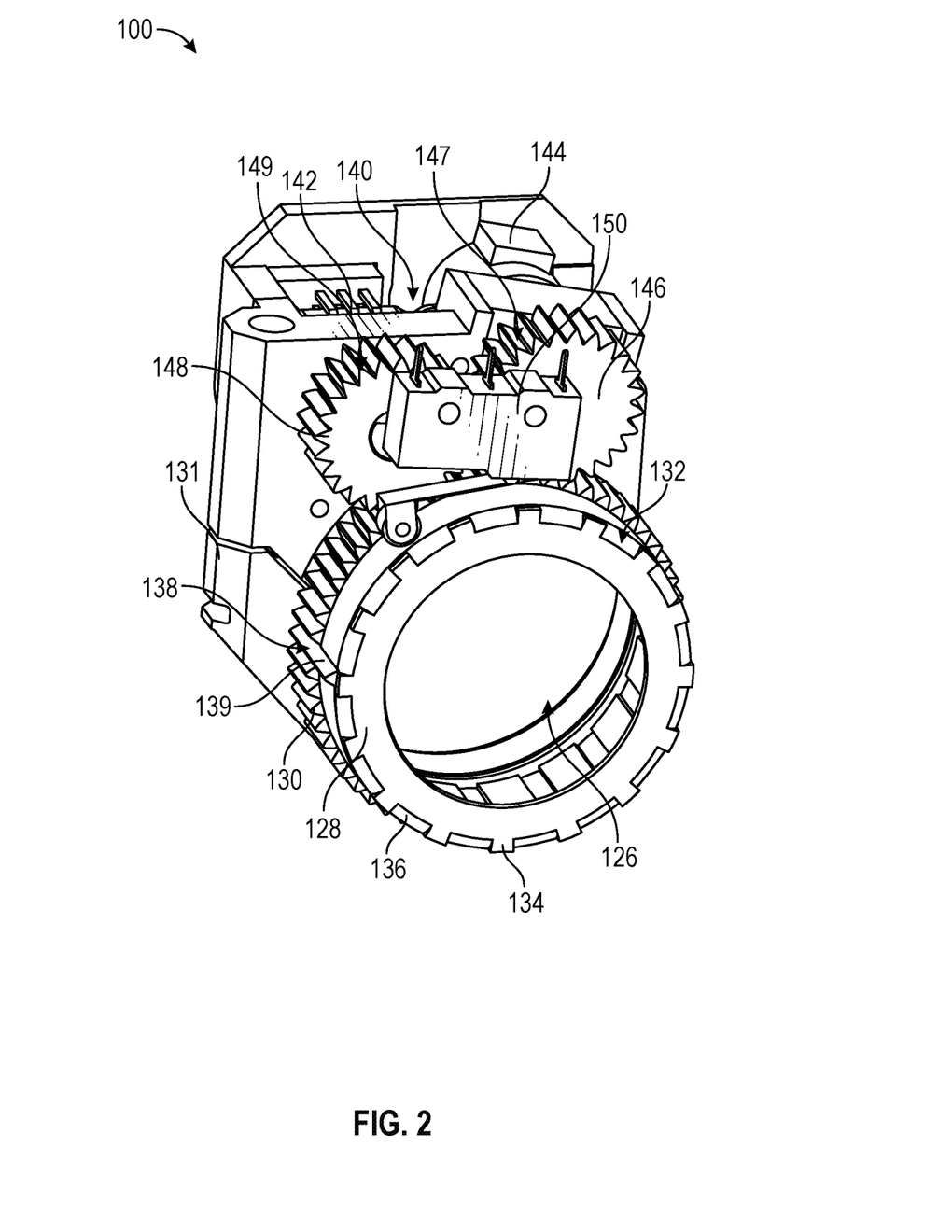
FIG. 2 illustrates a front perspective view of a focal adjustment apparatus of an electronic focal adjustment system for night vision devices.
Figure 3:
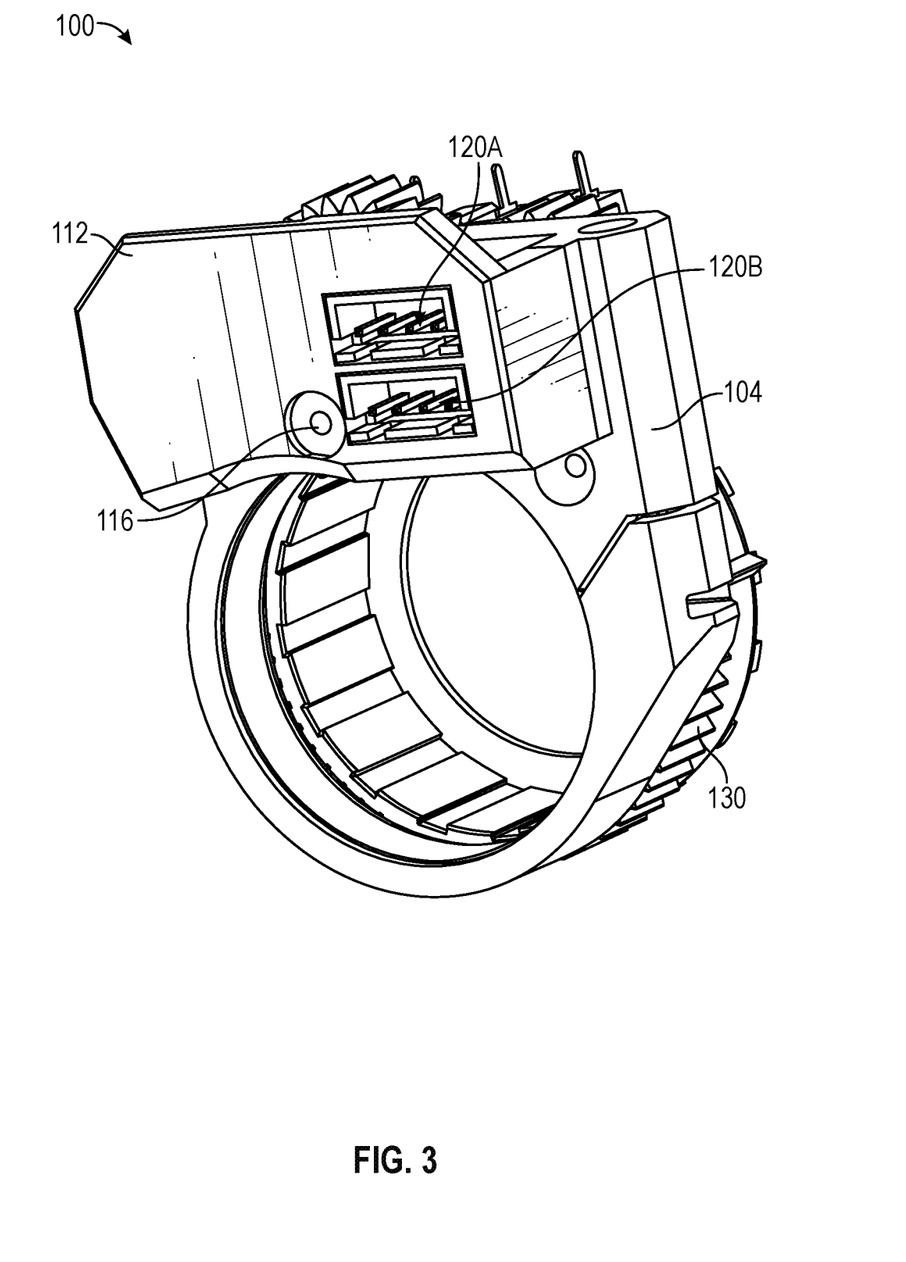
FIG. 3 illustrates a rear, side perspective view of a focal adjustment apparatus of an electronic focal adjustment system for night vision devices.

As shown in FIGS. 1-3, the focal adjustment apparatus 102 may comprise a housing 110 with a backplate 112 and a cover 114. The housing may be presented in numerous configurations, sizes, shapes, etc. without departing herefrom. The backplate 112 may be removably attachable to the housing 110 via one or more backplate fasteners 116 (e.g., screws). Meanwhile, the cover 114 may be a top portion of the housing 110 via cover fasteners 118 (e.g., screws and snap mechanisms). The backplate 112 and cover fasteners 118 may also include magnets, adhesive, or any other securement mechanism. The housing 110 may be manufactured from, for example, a plastic material, metal (e.g., steel, aluminum, or titanium), or carbon fiber. Further, certain portions of the housing may be manufactured from different material. For example, the backplate 112 may be a plastic material while the cover 114 may be a metal material. The backplate 112 may have one or more first ports 120A, 120B that may be configured to receive, for example, communication cables so as to connect to and communicate with the power source apparatus 104, the button apparatus 106, the sensor device 108, or a computing or smart device (e.g., computer, tablet, or smart phone). In some embodiments, the one or more first ports 120A, 120B may include JST connecters. Other types of ports may be used, such as USB, USB-C, or proprietary ports.

A lower surface 122 of the cover 114 may have an aperture 124 in a column protrusion 126 that substantially runs the length or height of the housing 110, which is attached to a side of the focal adjustment apparatus 102. The column 126 may descend to a housing fastening ring 127 (FIG. 13) that receives a lens ring 128 and a lens mount 130 both of which may be circularly shaped, thereby allowing a user to secure the lens ring 128 and lens mount 130 to the focal adjustment apparatus 102 via the cover fastener 118 that descends into the column 126 and the housing ring. The housing ring 127 may have a second column 131 that contacts a lower portion of the column 126 so as to create a single column via the cover fastener 118 that descends through the column 126. Loosening the cover fastener 118 may allow the housing ring 127 to have slight adjustability to its circumference so as to receive a night vision device therein. The lens ring 128 may comprise finger grooves 132. That is, the finger grooves 132 may include protrusions 134 and recessions 136 that allow a user, if needed to grip and rotate the lens ring 128 manually, clockwise or counterclockwise. Further, the lens mount 130 may comprise a plurality of first gear teeth 138. The plurality of first gear teeth 138 may comprise an extended gear tooth 139 that extends from the lens mount 130 to the lens ring 128.

When the cover 114 is removed, a user may view an internal compartment 140 of the housing 110. The internal compartment 140 may include a digital encoder 142 that is positioned between the column 126 and the back plate 112, a motor 144 (e.g., a brushless servo motor or stepper motor) proximate the digital encoder 142 that detects rotation, a motor gear 146 with motor teeth 147 fastened to the motor 144, an encoder gear 148 with encoder teeth 149 that is configured to function with the motor gear 146 to move the lens mount 130, and a switch 150 (e.g., a micro switch with a tipping point mechanism) that fastens to the motor gear 146 and encoder gear 148. The motor teeth 147 and encoder teeth 149 may contact so as to interact with each other and rotate the lens mount 130 to adjust the focal point of the night vision device. The switch 150 may be configured to function with the extended gear tooth 139 so as to limit movement of the lens mount 139 or to control rotation of the lens mount 139. In some embodiments, the switch 150 may be a reed switch.

Figure 4:
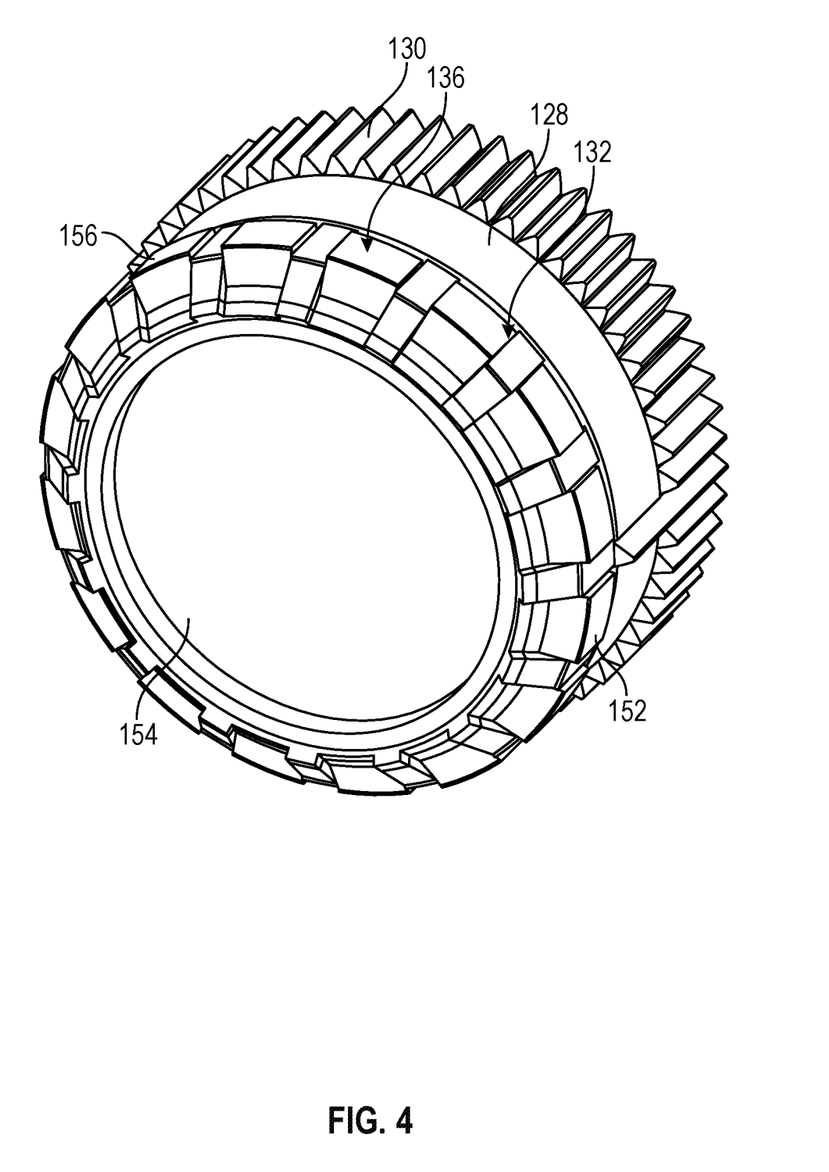
FIG. 4 illustrates a front, side perspective view of a lens cover of an electronic focal adjustment system for night vision devices.
Figure 5:
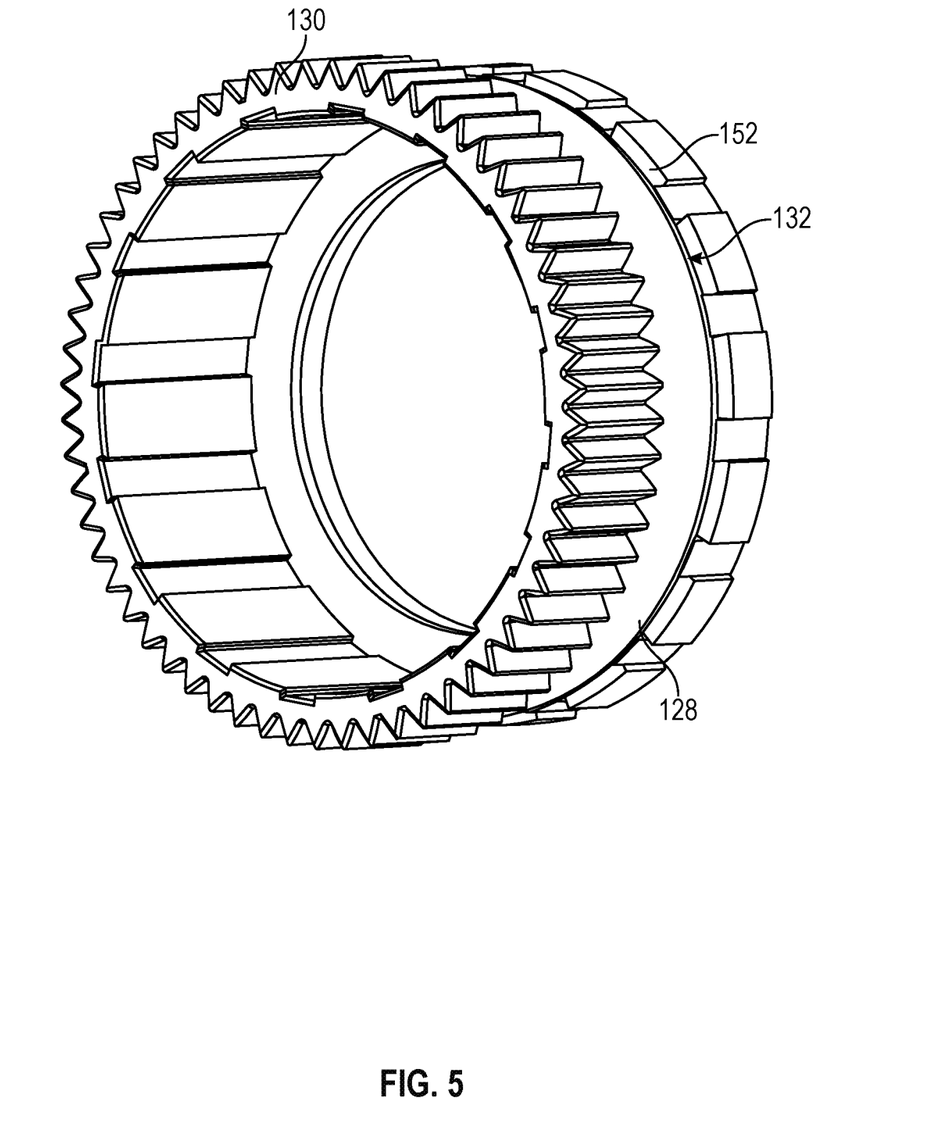
FIG. 5 illustrates a rear, side perspective view of a lens cover of an electronic focal adjustment system for night vision devices.

As shown in FIGS. 4-5, the lens ring 128 may be configured to receive a lens cover 152. The lens cover 152 may snap into the finger grooves 132 of the lens ring 128. The lens cover 152 may include a lens 154, such as a translucent or opaque lens. In some embodiments, the lens cover 152 may include a sacrificial lens and have a solid, blackout cover. The lens 154 may be circular in shape and circumscribed by the lens cover fastener, which may include a plurality of fingers 156 that are positioned in the finger grooves 132. That is, the plurality of fingers 156 may be positioned in the recessions 136 of the finger grooves 132 so as to secure the lens cover 152 to the lens ring 128. The fingers 156 and/or finger grooves 132 may utilize magnets to assist in securement of the lens cover 152.

Figure 6:
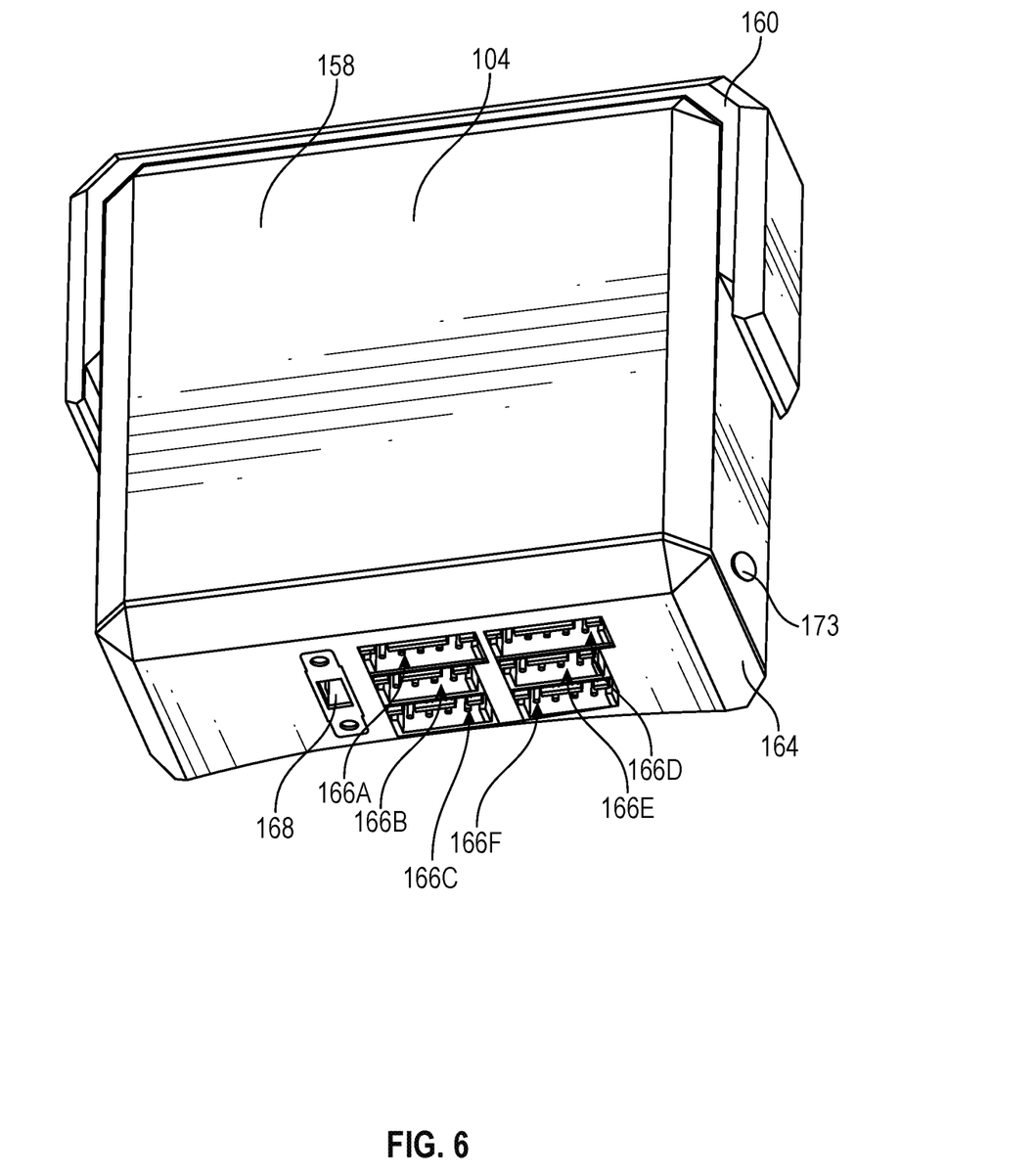
FIG. 6 illustrates a top perspective view of a power source apparatus of an electronic focal adjustment system for night vision devices.
Figure 7:
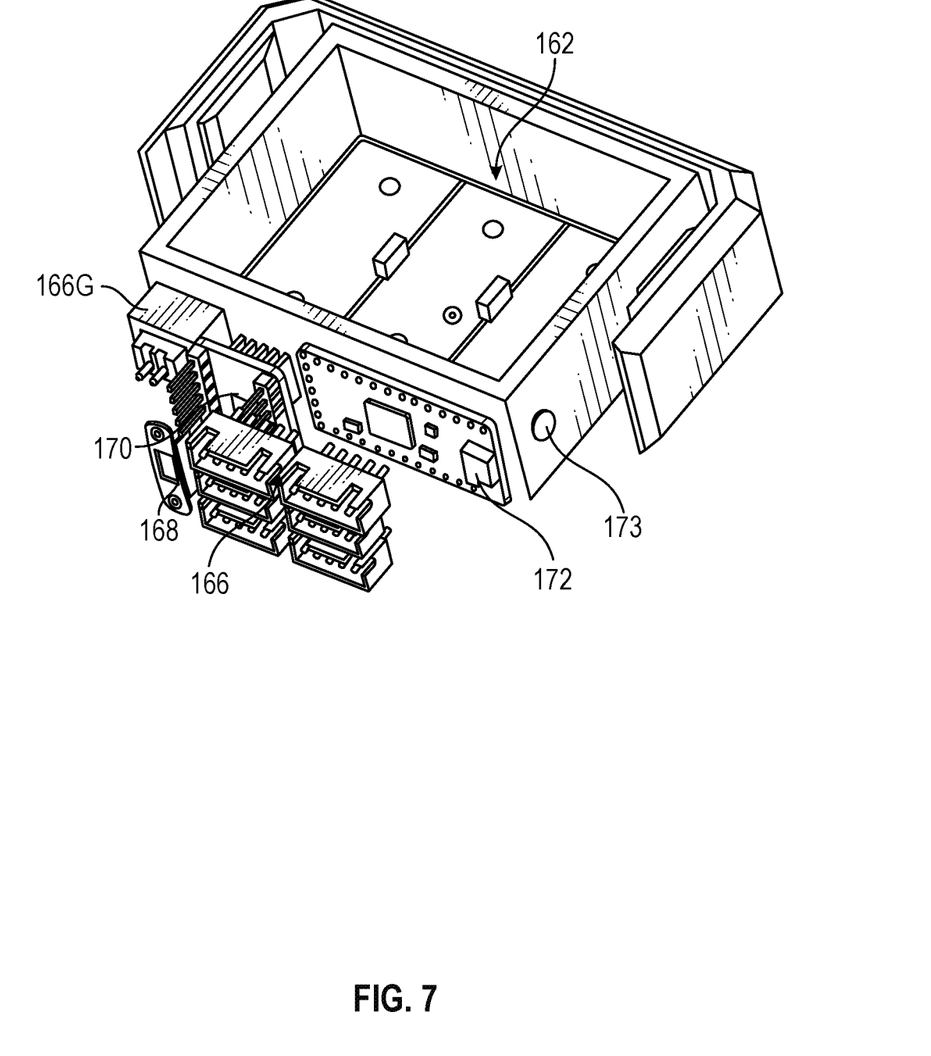
FIG. 7 illustrates a top perspective view of a power source apparatus of an electronic focal adjustment system for night vision devices.

As shown in FIGS. 6-7, the adjustment system 100 may comprise the power source apparatus 104 which connects to the focal adjustment apparatus 102 so as to provide power thereto. The power source apparatus 104 may be coupled to a helmet, a cap, or on the user's person. The power source apparatus 104 may comprise a battery housing 158 to receive a power source, such as batteries, whether disposable or rechargeable. The power source may include CR123A batteries, AA batteries, or any other type of battery or power source. The battery housing 158 may be generally square-shaped. However, any other shape or configuration may be used without departing herefrom, such as a cylindrical housing. On a front of the battery housing 158, a battery drawer 160, which comprises a power source compartment 162, may be removably attachable from the battery housing 158 so as to provide access to the power source compartment 162 and the power source. The battery housing 158 may be manufactured through injection molding, three-dimensional printing, or any other means of manufacturing in the art. Furthermore, on a rear of the battery housing 158 may be a back plate 164 that covers and/or circumscribes a plurality of battery housing ports 166A-166G (e.g., JST connectors, USB, USC-C, or proprietary ports). The rear of the battery housing 158 may also have a battery switch 168 (e.g., on/off switch) that controls activation of power to the battery apparatus 104, a motor driver 170 that interacts with the switch 168, and a processor 172 (e.g., Adafruit ItsyBitsy 32u4-5V 16 MHz). In some embodiments, the motor driver 170 may be replaced by a PCB. The processor 172 may utilize Arduino or Raspberry. In some embodiments, the power source apparatus 104 may include a PCB board. The power source apparatus 104 may couple to the focal adjustment apparatus 102, button apparatus 106, and/or sensor device 108 via one or more cables for communication. It will be appreciated that the power source apparatus 104 does not only provide power, but may also act as a computing module via the processor. In some embodiments, the power source apparatus 104 may provide power not only to the apparatus 100 but may also provide power to the actual night vision device. A user may utilize multiple power source apparatuses 104 so as to ensure that the adjustment system 100 may always have power. In addition, the power source apparatus 104 may include a calibration button 173 that allows a user, when pressed, to select various focal points (based on the user and viewing distance) and save those calibrations so that a user may select them via the button apparatus 106 discussed below.

Figure 8:
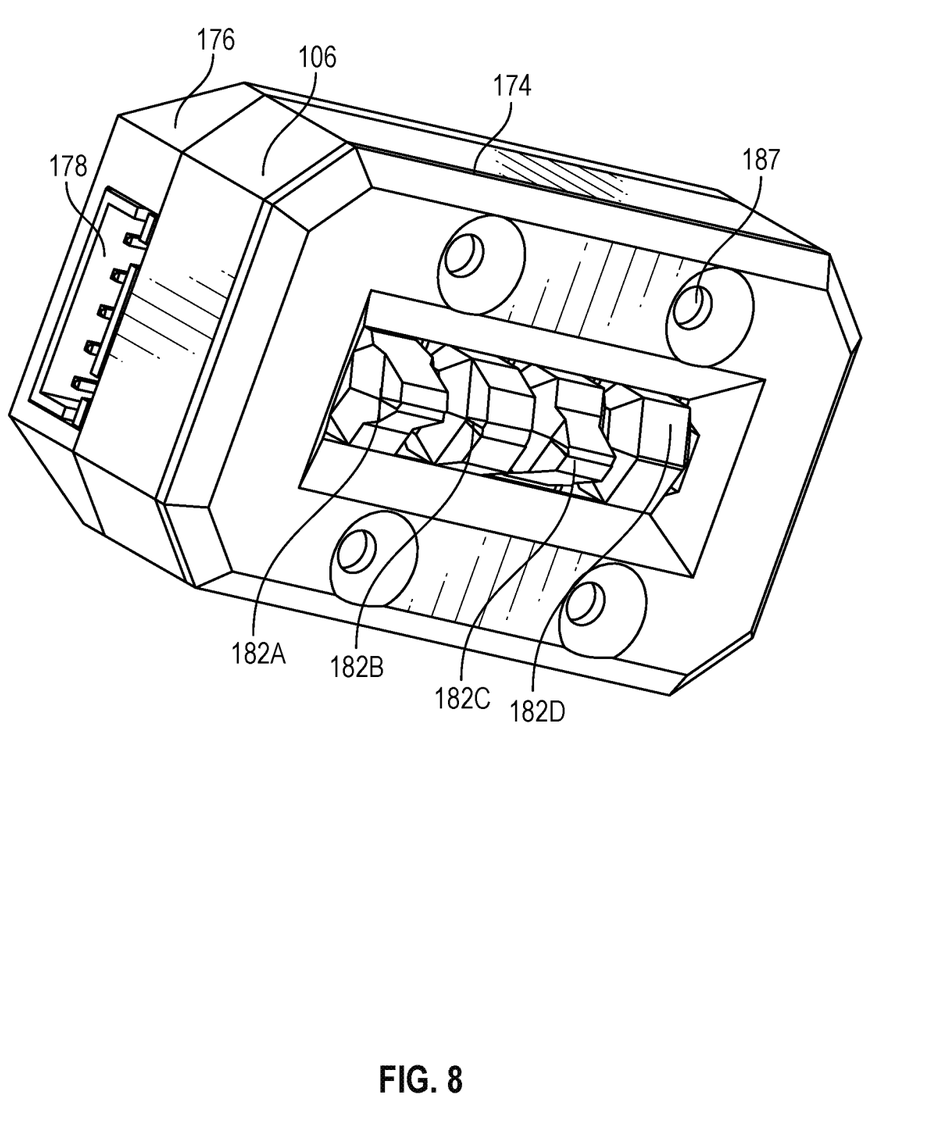
FIG. 8 illustrates a front, side perspective view of a button apparatus of an electronic focal adjustment system for night vision devices.
Figure 9:
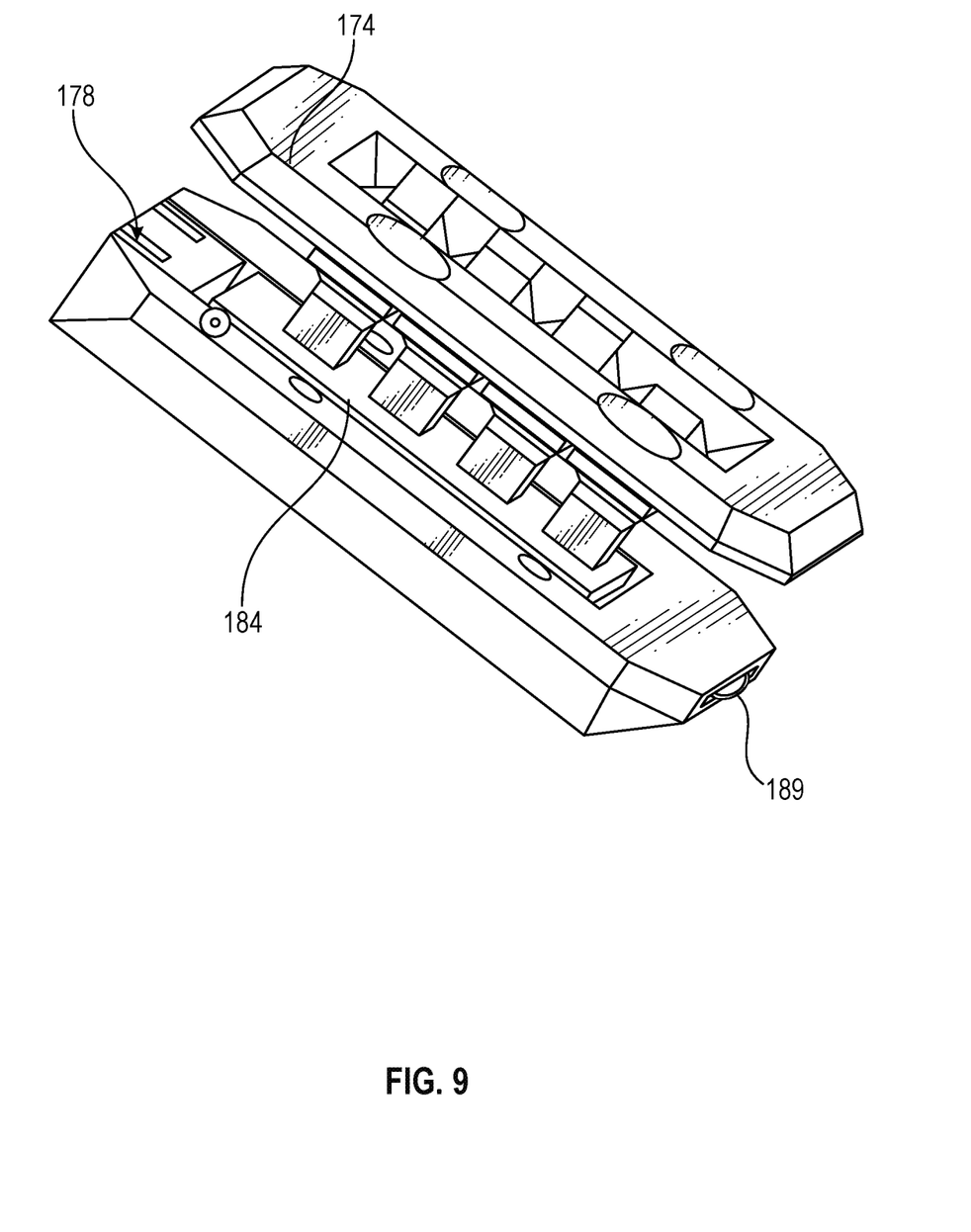
FIG. 9 illustrates an exploded view of a button apparatus of an electronic focal adjustment system for night vision devices.

As shown in FIGS. 8-9, the button apparatus 106 may include a front button cover 174 and a back button cover 176. The back button cover 176 may comprise a button apparatus port 178 (e.g., JST connectors, USB, USC-C, or proprietary ports) and a PCB board 180. A plurality of buttons 182A-182D may communicate and interact with the PCB board 184. The plurality of buttons 182A-182D may control the adjustment of the lens mount 130 and lens ring 128. For example, each button may be calibrated for a certain distance so that when selected will rotate the lens ring and mount 128, 130 to increase visual clarity. The front button cover 174 may comprise a recessed portion 186 that receives the plurality of buttons 182 that interact with the PCB board 184. The front button cover 174 and the back button cover 176 may be coupled together with fasteners 187, such as screws or snap mechanisms. When in use, the button apparatus 106 may be positioned on a side of a helmet, on a cap, or on a user's person. Further, the button apparatus 106 may include an adjustment button/wheel 189 (e.g., a scroll button/wheel) that allows a user to adjust and/or scroll through calibrations by moving from one pre-set calibration to another, allows a user to adjust the objective lens of the night visions device to find the best focal points for a user, and allows a user to quickly adjust the objective lens.

Figure 10:
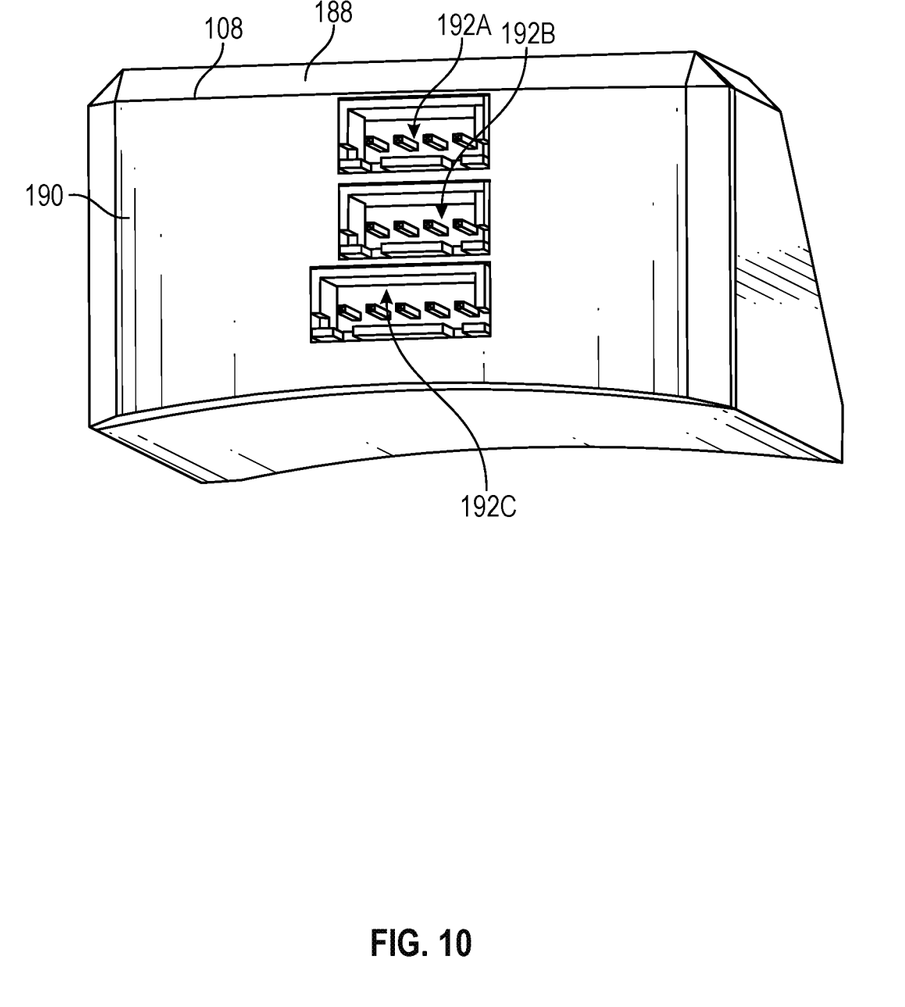
FIG. 10 illustrates a rear perspective view of a sensor device of an electronic focal adjustment system for night vision devices.
Figure 11:
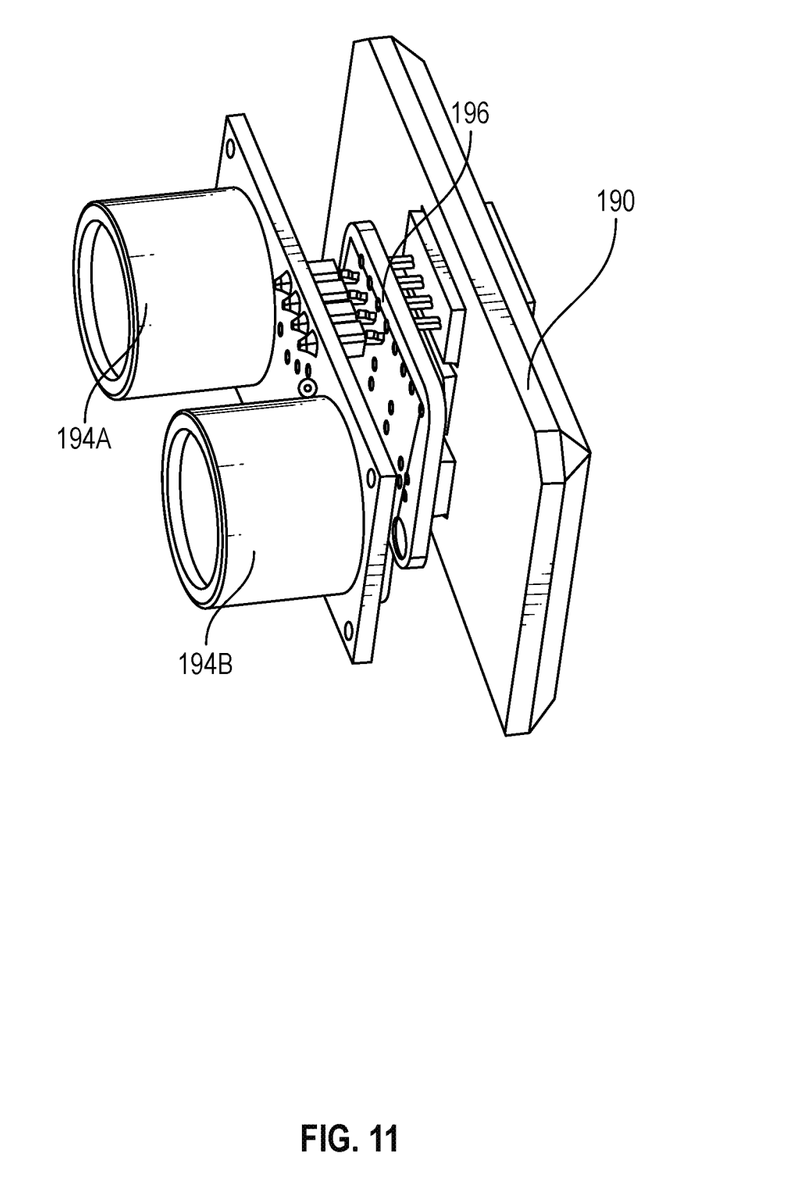
FIG. 11 illustrates a partial exploded view of a sensor device of an electronic focal adjustment system for night vision devices.
Figure 12:
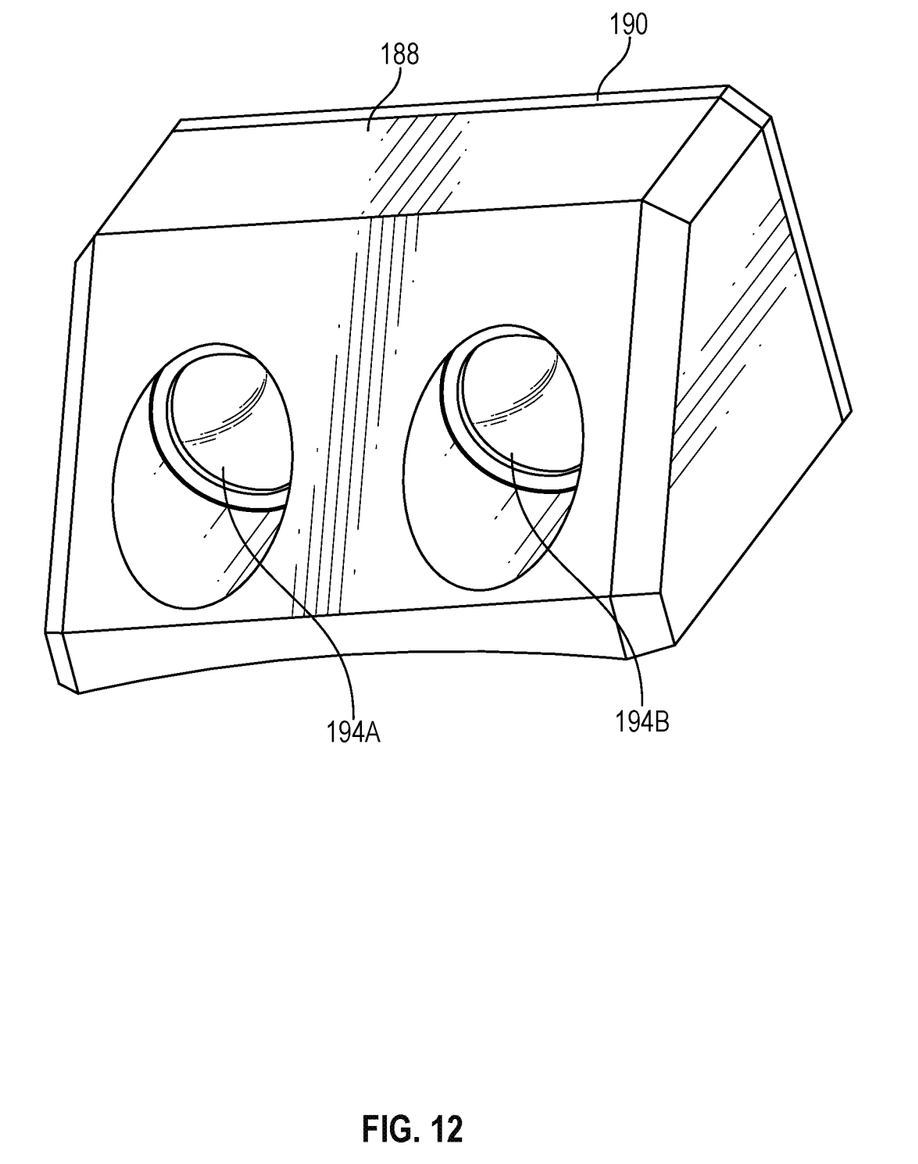
FIG. 12 illustrates a front, side perspective view of a sensor device of an electronic focal adjustment system for night vision devices.

As shown in FIGS. 10-12, the sensor device 108 may comprise a sensor housing 188 and a sensor back plate 190. Positioned in the back plate 190 may be a plurality of sensor ports 192A-192C (e.g., JST connectors, USB, USC-C, or proprietary ports) that may receive cables so as to communicate with the focal adjustment apparatus 102, the power source apparatus 104, and/or the button apparatus 106. The sensor device 108 may comprise sensors 194A, 194B, such as ultrasonic sensors that measure distance to a target, thereby increasing accuracy of focal point adjustments. The sensor device 108 may also include a gyroscope 196.

Figure 13:
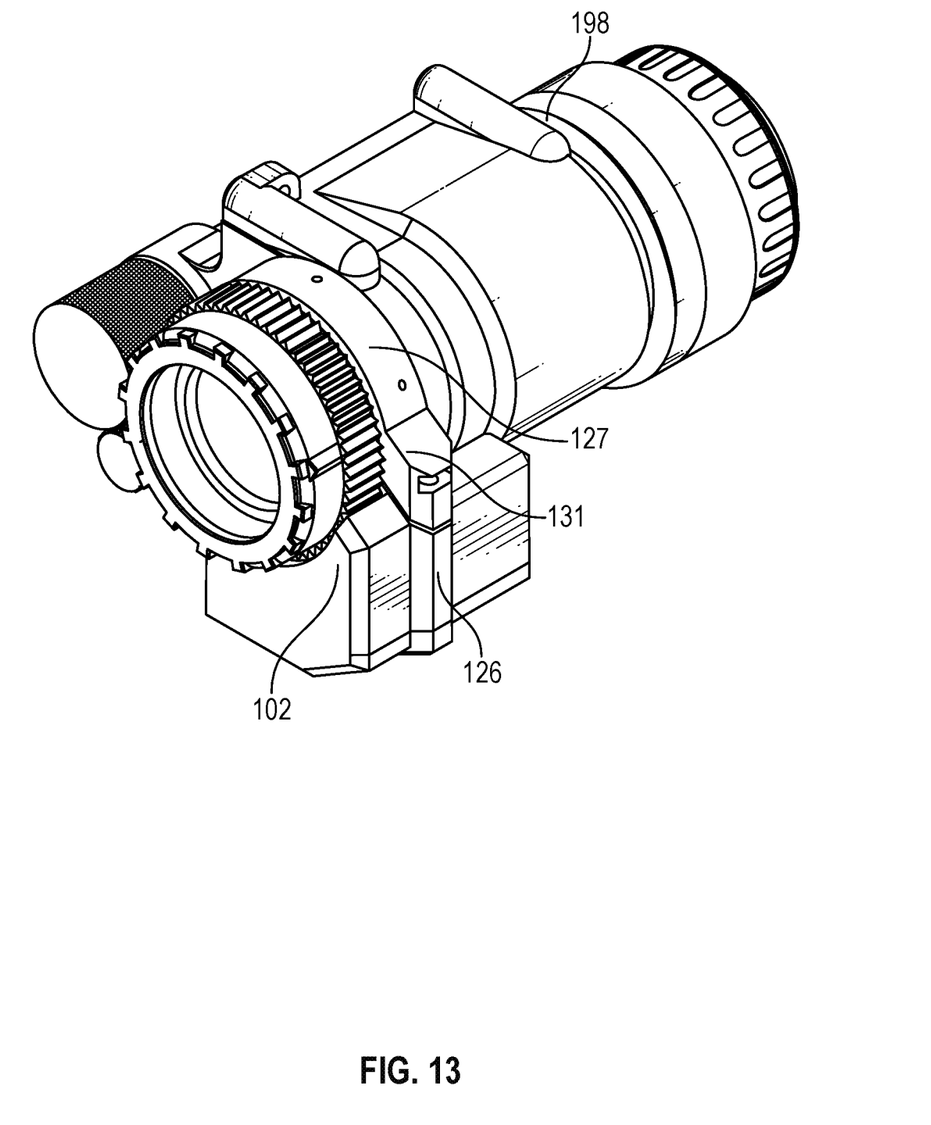
FIG. 13 illustrates a bottom, side perspective view of a focal adjustment apparatus of an electronic focal adjustment system for night vision devices connected to a night vision device.
Figure 14:
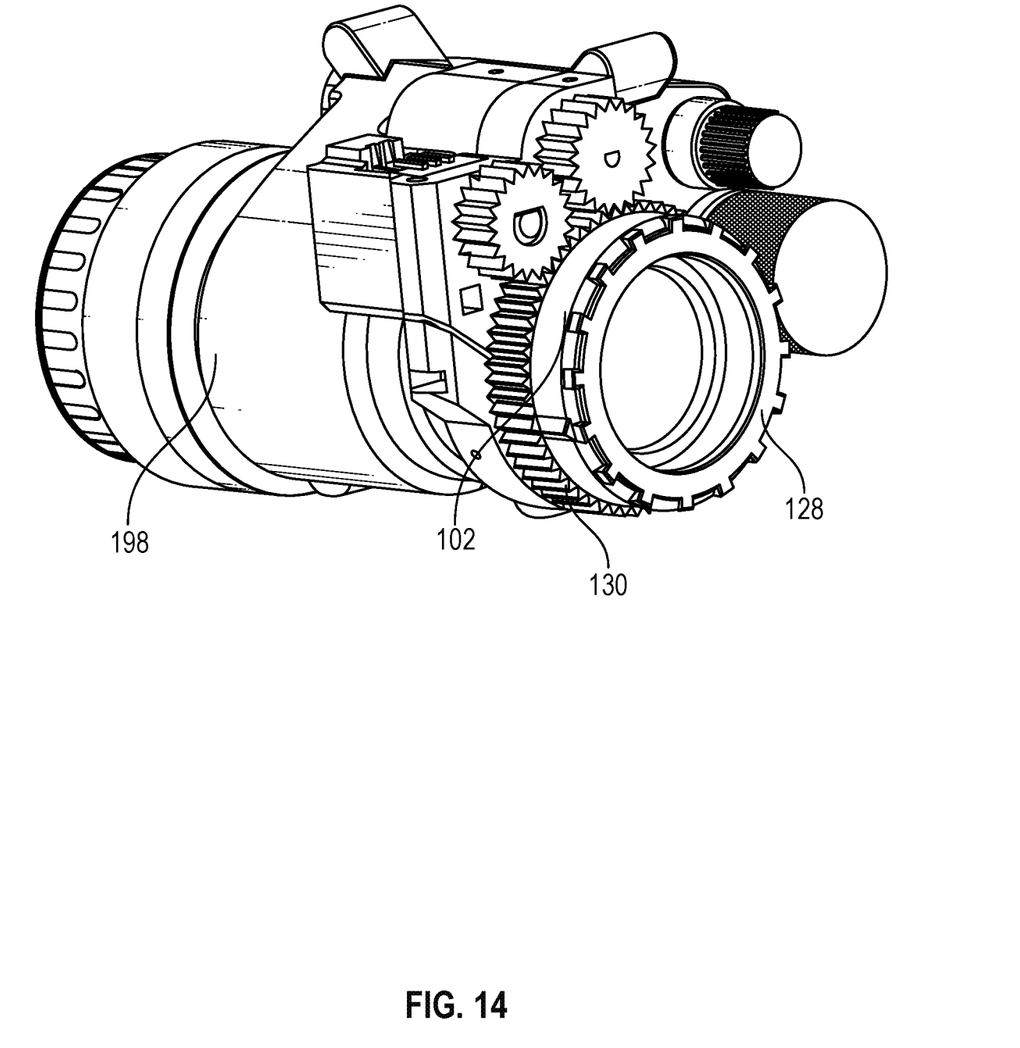
FIG. 14 illustrates a bottom, side perspective view of a focal adjustment apparatus of an electronic focal adjustment system for night vision devices connected to a night vision device.

As shown in FIGS. 13-14, the focal adjustment apparatus 102 may be coupled to a night vision device 198. Referring to FIG. 14, the focal adjustment apparatus may include a non-stepper motor.

It will be appreciated that the adjustment system 100 may, in some embodiments, be configured into a single-unit, meaning the power source apparatus 104, the button apparatus 106, and the sensor device 108 may be integrated into the focal adjustment apparatus 102. It will further be appreciated that the adjustment system 100 in some embodiments may be an entirely self-contained unit in the objective lens.

In other embodiments, the adjustment system 100 with its various components may be connected via wires, as described above, or wirelessly and may communicate through transmitters and receivers or transceivers within the various components, such as the focal adjustment apparatus 102, the sensor device 108, and/or button apparatus 106.

To function, the adjustment system 100 changes the focus of the night vision device by controlling the objective lens and changing the focal point. To accomplish this and as discussed above, the adjustment system 100 may utilize the focal adjustment apparatus 102 that receives and gives feedback to the power source apparatus 104. Code in the processor 172, or other computing systems in the adjustment system 100, may allow a user to preset the objective lens of the night vision device by using the button apparatus 106 to select pre-calibrated distances that are specific to each user. The calibration process may use, for example, the motor 144 to send feedback to the processor 172 to save the various positions of the objective lens based on distances predetermined by the user. For the user to select pre-calibrated distances, the user may rotate/twist the objective lens until it reaches the desired focus at a given distance, then by pressing one or more of the plurality of buttons 182A-182D the processor 172 can save this as one option. As an example, when the user is 20 yards away from a desired viewable object, the user may select the pre-calibrated 20-yard button of the plurality of buttons 182A-182D. The user can repeat this process until all positioning options are occupied. After the calibration process, the adjustment system 100 may use the buttons 182A-182D that quickly changes the focal point of the night vision device to allow the user to switch the pre-calibrated distances. In some embodiments, the user may not only use the pre-calibrated distance buttons, but may also have a button that adjusts the focal point to distances that were not previously calibrated.

Further, the adjustment system 100 may include a wiring harness and a vibration module that provides feedback to a user. In some embodiments, different methods may be used to control the processor 172 such as to adjust the focus of the device and multiple buttons set to different distances. In one embodiment, the adjustment system 100 may be an entirely self-contained unit in the objective lens. In one embodiment, the adjustment system 100 may utilize a diaphragm or an aperture.

It will be appreciated that there are numerous advantages with the adjustment system 100, such as changing the focal point quickly and purposefully and limiting body movement by a user to adjust the objective lens of the night vision device. Further, the adjustment system 100 does not restrict the amount of light entering the night vision device, which is extremely important due to the fact that access to light is crucial for quality viewing through a night vision device.

In some embodiments, the adjustment system 100 may use AI so as to adjust the code and or processor to a particular user and his/her focal point adjustments. Further, it will be understood that the adjustment system 100 is not limited to a monocular night vision device and may be used with a binocular night vision device. The adjustment system 100 may communicate wirelessly or via wires. It will be appreciated that the focal adjustment apparatus 102, the button apparatus 106, and the sensor device 108 may be connected to the power source apparatus 104 either wirelessly or with wires. The sensor device 108 may also be connected to the focal adjustment apparatus 102.

In some embodiments, the adjustment system 100 may be integrated into the manufacturing process of a night vision device, meaning that the system 100 and the night vision device are a single, manufactured unit. In other embodiments, the adjustment system 100 may be integrated into the objective lens of a night vision device.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. An electronic focal adjustment system for a night vision device, the electronic focal adjustment system comprising:
   a focal adjustment apparatus that couples to an objective lens of the night vision device, the focal adjustment apparatus comprising a housing that has one or more first ports, a lens ring, a lens mount, one or more gears, and a motor that interacts with the one or more gears, the one or more gears rotate the lens ring, the lens mount, and the objective lens of the night vision device;
   a power source apparatus that couples to and communicates with the focal adjustment apparatus; and
   a button apparatus that communicates with the power source apparatus to adjust the objective lens of the night vision device.

2. The electronic focal adjustment system of claim 1, wherein the one or more first ports comprise JST connectors.

3. The electronic focal adjustment system of claim 1, wherein the power source apparatus comprises a battery drawer that is removably attachable to the power source apparatus and receives a power source, whether disposable or rechargeable.

4. The electronic focal adjustment system of claim 1, wherein the power source apparatus comprises a back plate that includes a plurality of battery housing ports.

5. The electronic focal adjustment system of claim 1, wherein the power source apparatus comprises a switch, a motor, and a processor.

6. The electronic focal adjustment system of claim 1, wherein the button apparatus comprises a front button cover and a back button cover.

7. The electronic focal adjustment system of claim 1, wherein the button apparatus comprises a plurality of buttons that when actuated send signals to the focal adjustment apparatus to adjust the night vision device to pre-calibrated focal points.

8. The electronic focal adjustment system of claim 1, further comprising a sensor device.

9. The electronic focal adjustment system of claim 8, wherein the sensor device comprises a second housing and a sensor back plate.

10. The electronic focal adjustment system of claim 8, wherein the sensor device comprises a plurality of sensor ports.

11. The electronic focal adjustment system of claim 8, wherein the sensor device comprises one or more ultrasonic sensors.

12. The electronic focal adjustment system of claim 8, wherein the sensor device comprises a gyroscope.

13. An electronic focal adjustment system for a night vision device, the electronic focal adjustment system comprising:
a focal adjustment apparatus that couples to an objective lens of the night vision device, the focal adjustment apparatus comprising:
a housing with a backplate and a cover,
one or more first ports,
a lens ring,
a lens mount,
a motor that interacts with one or more gears, the one or more gears rotate the lens ring and the lens mount to adjust the objective lens;
a power source apparatus that provides power to the electronic focal adjustment system, the power source apparatus comprising a switch to actuate the power source apparatus and a processor;
a button apparatus with one or more buttons;
a sensor device comprising one or more sensors and a gyroscope;
wherein the button apparatus, the sensor device, and the focal adjustment apparatus communicate with the power source apparatus to adjust the objective lens of the night vision device to pre-calibrated focal points.

14. The electronic focal adjustment system of claim 13, wherein the one or more first ports comprise JST connectors, USB ports, and/or USB-C ports.

15. The electronic focal adjustment system of claim 13, wherein the housing comprises a column protrusion that substantially runs the length of the housing, the column protrusion contacting and securing a housing ring.

16. The electronic focal adjustment system of claim 13, further comprising a removably attachable lens cover that fastens to finger grooves on the lens ring.

17. The electronic focal adjustment system of claim 15, wherein the housing ring receives and secures the objective lens of the night vision device.

18. An electronic focal adjustment system for a night vision device, the electronic focal adjustment system comprising:
a focal adjustment apparatus that couples to an objective lens of the night vision device, the focal adjustment apparatus comprising:
one or more first ports,
a lens ring comprising finger grooves,
a lens mount,
a housing ring that mates with the lens mount, the lens ring, and the objective lens of the night vision device;
a motor that interacts with one or more gears, the one or more gears rotate the lens ring, the lens mount, and the objective lens of the night vision device;
a power source apparatus that provides power to the electronic focal adjustment system, the power source apparatus comprising a switch to actuate the power source apparatus and a processor;
a button apparatus with one or more buttons and an adjustment wheel;
a sensor device comprising a sensor housing and sensor back plate, the sensor housing comprising:
one or more sensors,
a plurality of sensor ports that receive cables, and
a gyroscope;
a lens cover comprising a plurality of fingers that fasten to the finger grooves of the lens ring;
wherein the button apparatus, the sensor device, and the focal adjustment apparatus communicate with the power source apparatus to adjust the objective lens of the night vision device to pre-calibrated focal points.

* * * * *